(12) United States Patent
Chi et al.

(10) Patent No.: US 7,967,494 B2
(45) Date of Patent: Jun. 28, 2011

(54) LIGHT GUIDE PANEL WITH CURVED WEDGE-SHAPE PRISMS, AND DISPLAY AND METHODS INCLUDING THE SAME

(75) Inventors: Chul Goo Chi, Uiwang-si (KR); Sung Hyun Joo, Uiwang-si (KR); O Yong Jeong, Uiwang-si (KR); Seong Hoon Lee, Uiwang-si (KR)

(73) Assignee: Cheil Industries, Inc., Gumi-si, Kyeongsangbuk-do (KR)

( * ) Notice: Subject to any disclaimer, the term of this patent is extended or adjusted under 35 U.S.C. 154(b) by 0 days.

(21) Appl. No.: 12/458,528

(22) Filed: Jul. 15, 2009

(65) Prior Publication Data

US 2010/0014318 A1 Jan. 21, 2010

Related U.S. Application Data

(63) Continuation of application No. PCT/KR2007/006552, filed on Dec. 14, 2007.

(30) Foreign Application Priority Data

Jan. 15, 2007 (KR) .................. 10-2007-0004124

(51) Int. Cl.
*F21V 7/09* (2006.01)
*F21V 7/07* (2006.01)
(52) U.S. Cl. ........ 362/626; 362/623; 362/620; 362/617; 349/65
(58) Field of Classification Search .................. 362/617, 362/620, 623, 626; 349/65
See application file for complete search history.

(56) References Cited

U.S. PATENT DOCUMENTS

| 5,390,436 | A * | 2/1995 | Ashall | 362/618 |
| 5,980,054 | A * | 11/1999 | Fukui et al. | 362/625 |
| 6,130,730 | A * | 10/2000 | Jannson et al. | 362/623 |
| 6,454,452 | B1 * | 9/2002 | Sasagawa et al. | 362/626 |
| 7,056,005 | B2 * | 6/2006 | Lee | 362/625 |
| 7,278,774 | B2 * | 10/2007 | Chang | 362/626 |
| 7,364,342 | B2 * | 4/2008 | Parker et al. | 362/626 |
| 7,380,968 | B2 * | 6/2008 | Yamashita et al. | 362/626 |
| 7,465,083 | B2 | 12/2008 | Ohkawa | |
| 2003/0058633 | A1* | 3/2003 | Suzuki | 362/623 |
| 2005/0094295 | A1* | 5/2005 | Yamashita et al. | 359/833 |
| 2006/0250817 | A1* | 11/2006 | Yamashita et al. | 362/606 |
| 2007/0189040 | A1 | 8/2007 | Chi et al. | |
| 2009/0109704 | A1* | 4/2009 | Chen et al. | 362/626 |
| 2009/0154197 | A1* | 6/2009 | Sun et al. | 362/618 |

FOREIGN PATENT DOCUMENTS

| KR | 10-2005-0045187 A | 5/2005 |
| KR | 10-2005-0105984 A | 11/2005 |
| KR | 10-2006-0051190 A | 5/2006 |
| KR | 10-0662540 B1 | 12/2006 |

* cited by examiner

*Primary Examiner* — Ismael Negron
(74) *Attorney, Agent, or Firm* — Lee & Morse, P.C.

(57) ABSTRACT

A light guide panel includes a lateral side configured to transmit light to an interior of the light guide panel, a rear side configured to reflect light to the interior of the light guide panel, and a front side configured to emit light from the interior of the light guide panel, wherein the rear side includes a repeating pattern of regions, each region having a plurality of wedge-shaped rear prisms disposed therein, and the wedge-shaped rear prisms include at least one of a side having a predetermined radius of curvature and a side having a point of inflection.

14 Claims, 8 Drawing Sheets

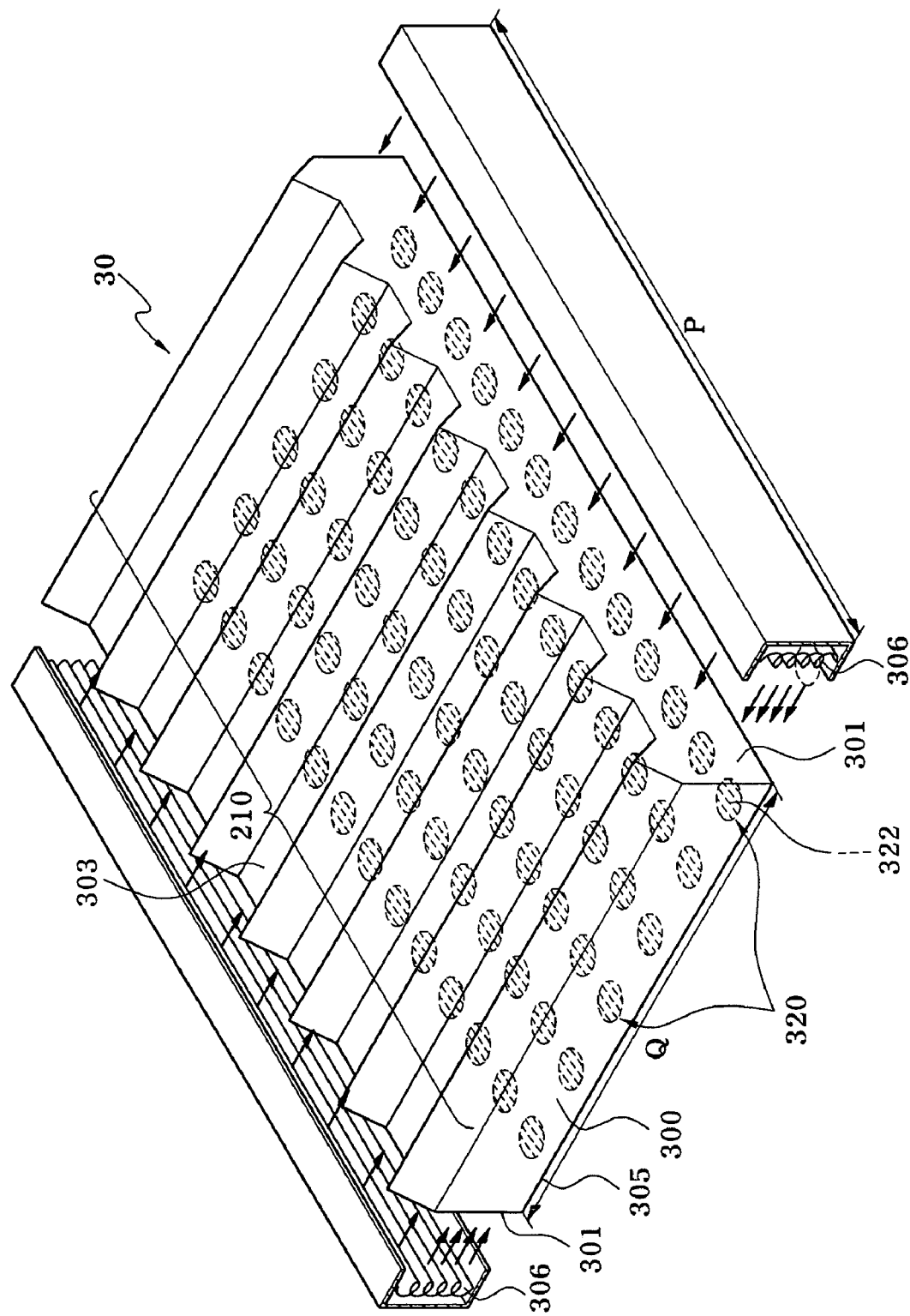
[FIG. 1]

[FIG. 2]
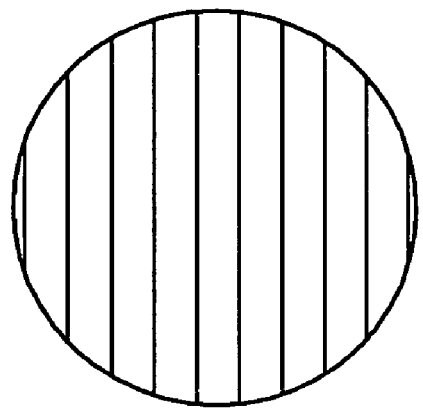
[FIG. 3]
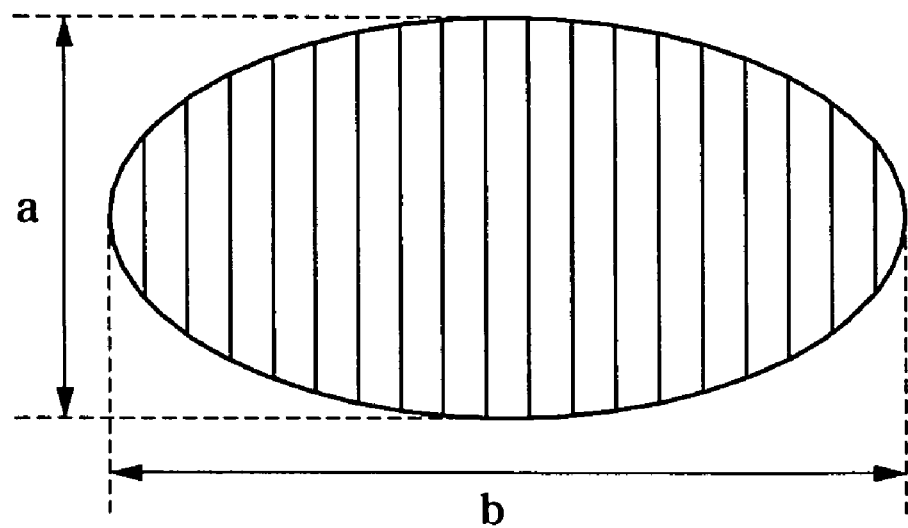

[FIG. 4]
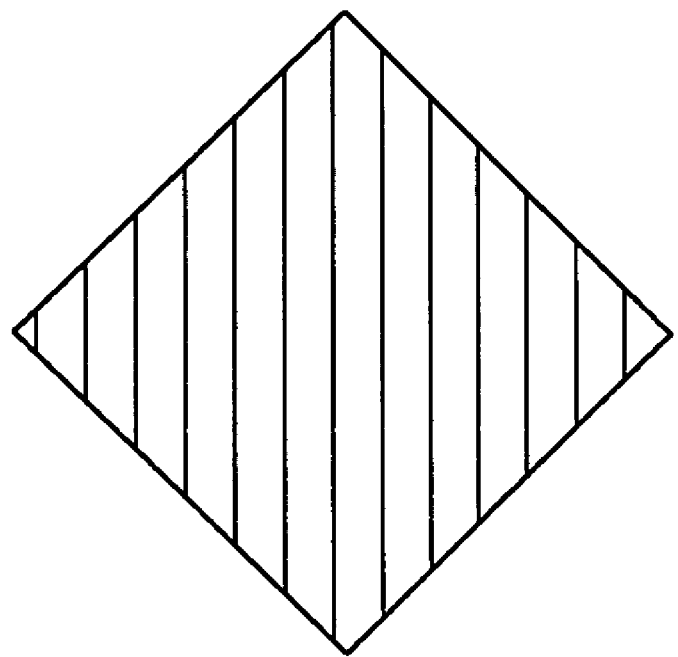
[FIG. 5]
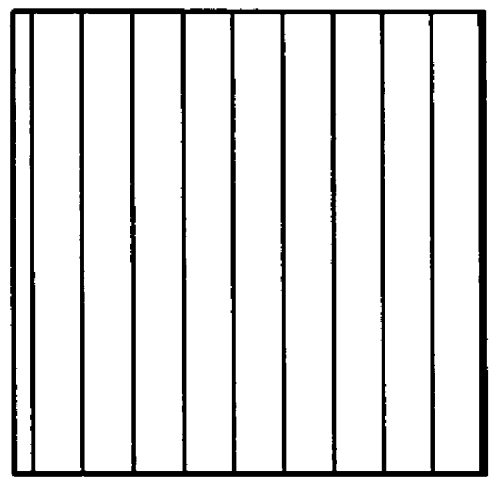

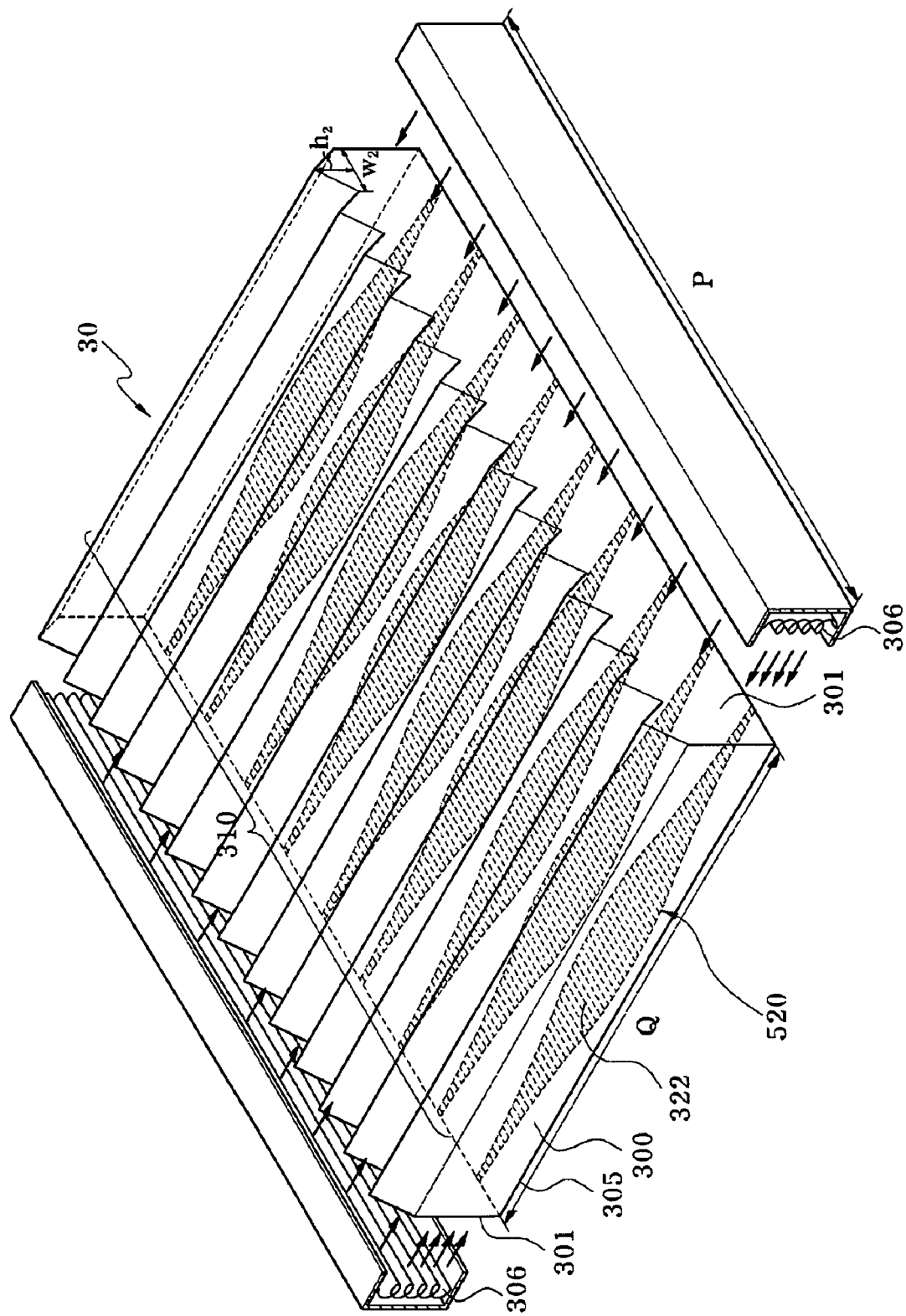
[FIG. 6]

[FIG. 7]
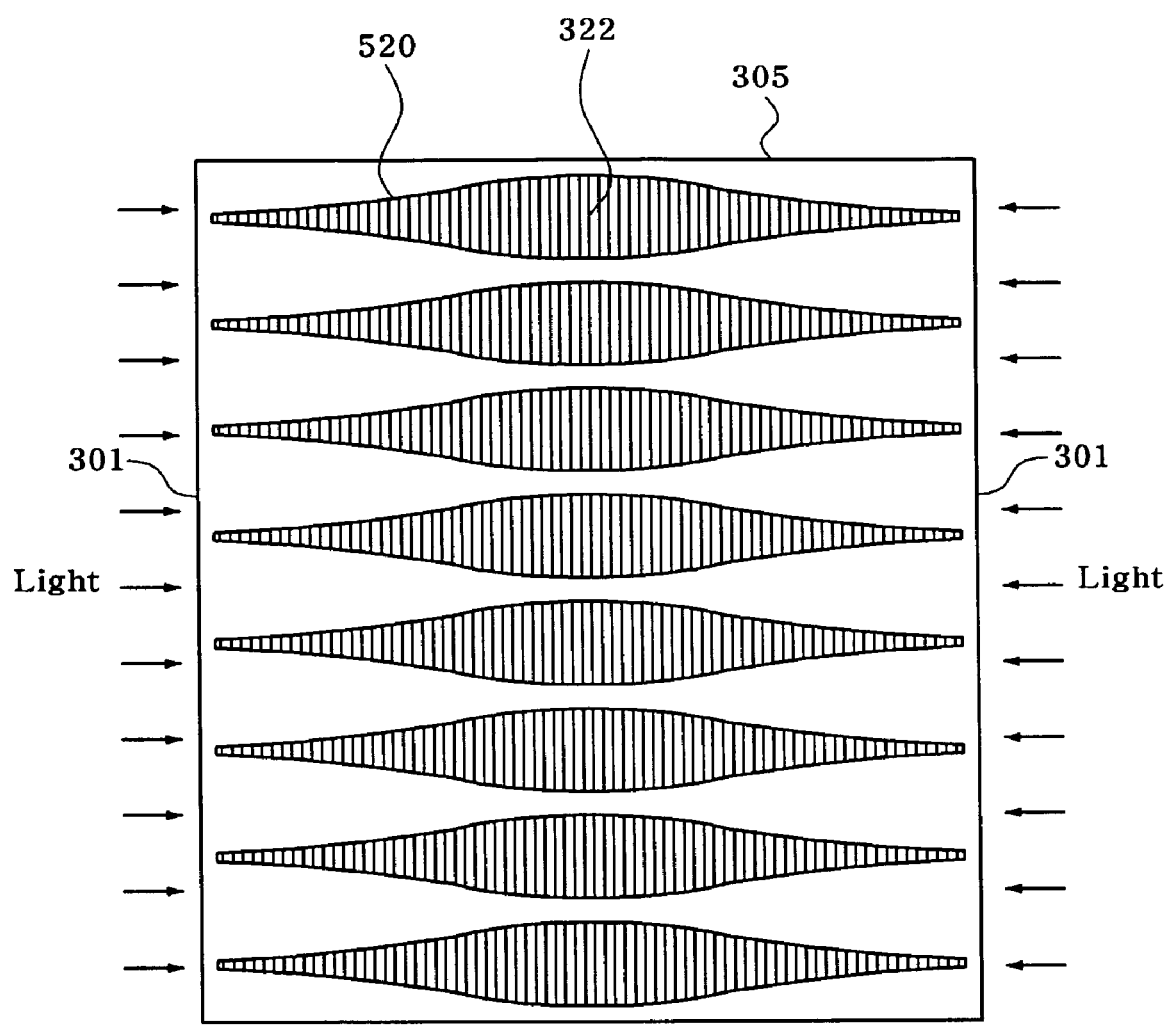

[FIG. 8]
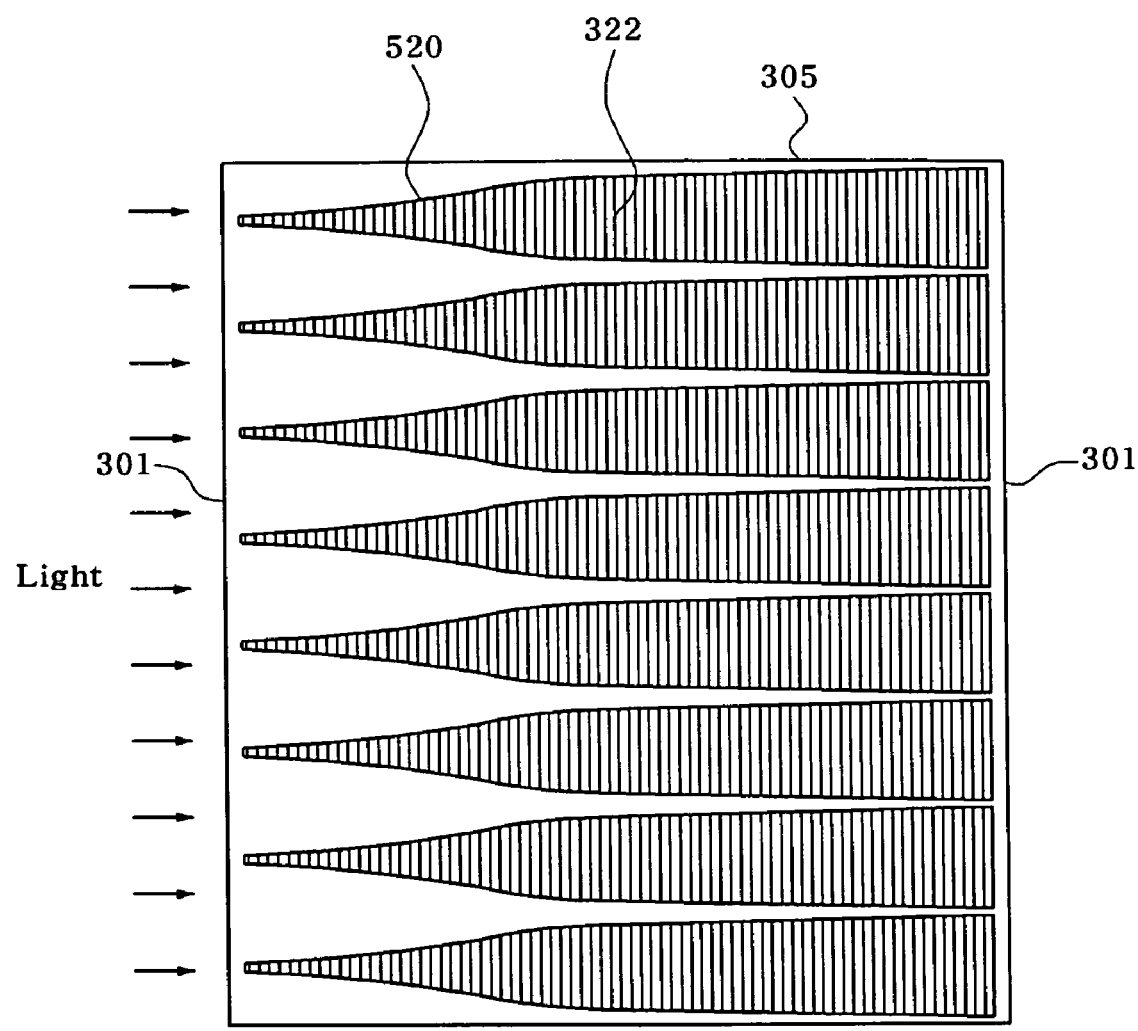

[FIG. 9]
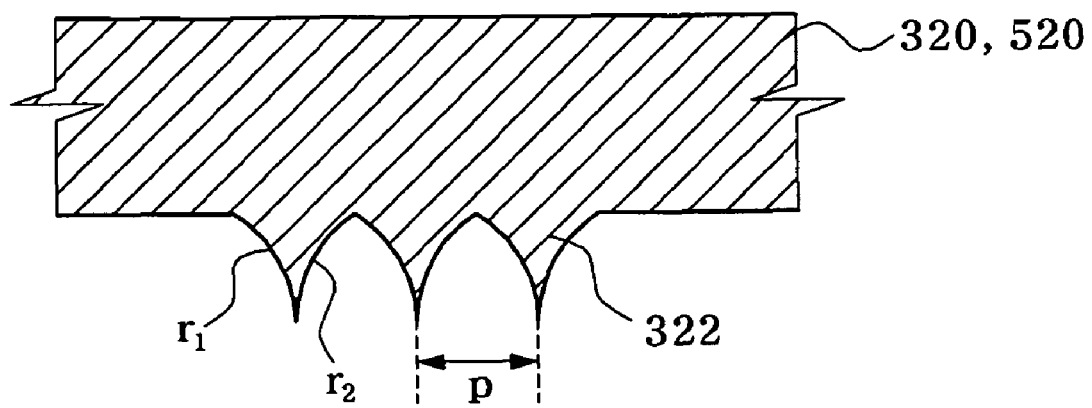
[FIG. 10]
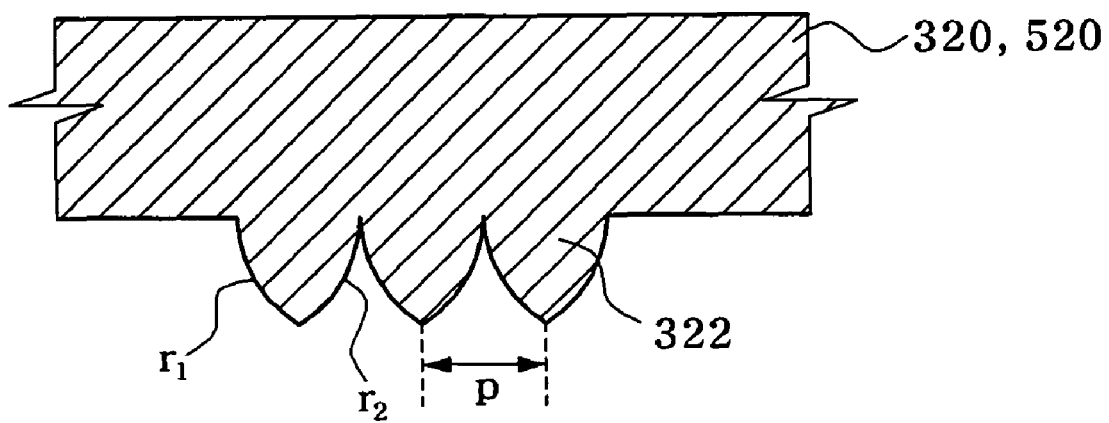

[FIG. 11]
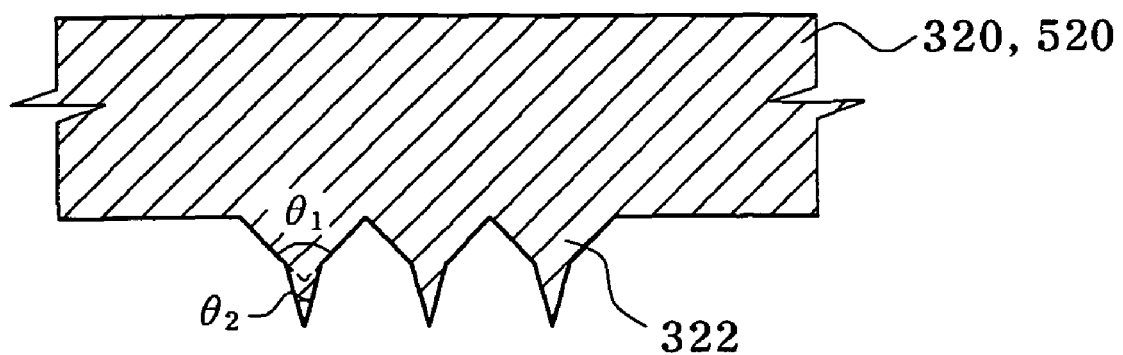
[FIG. 12]
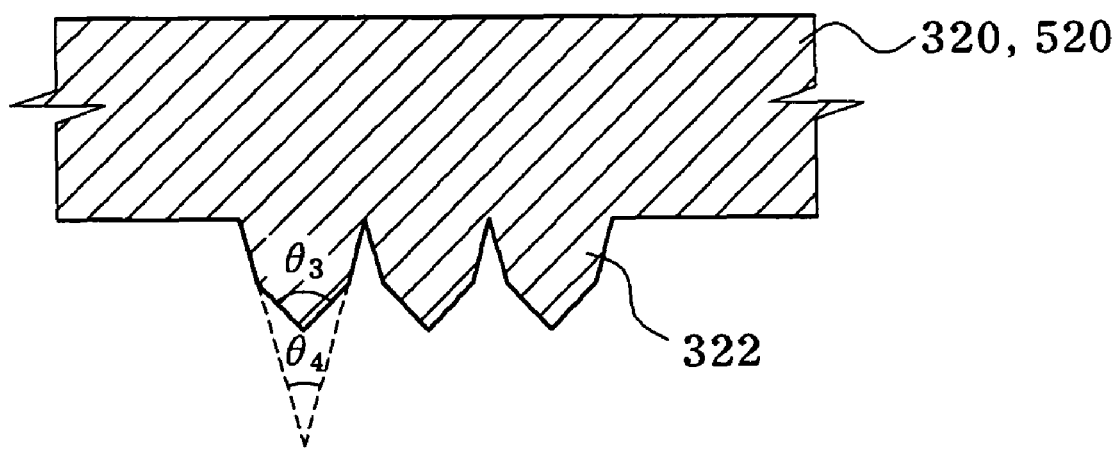

LIGHT GUIDE PANEL WITH CURVED WEDGE-SHAPE PRISMS, AND DISPLAY AND METHODS INCLUDING THE SAME

CROSS-REFERENCE TO RELATED APPLICATION

The present application is a continuation of co-pending PCT Patent Application Ser. No. PCT/KR2007/006552, entitled, "Light Guide Panel Comprising Wedge-shaped Rear Prism for Back Light Unit of TFT-LCD," which was filed on Dec. 14, 2007.

FIELD OF THE INVENTION

Embodiments relate a light guide panel, a display including the same, and associated methods.

DESCRIPTION OF THE RELATED ART

A liquid crystal display (LCD) may be provided with a backlight unit as a light source for emitting light. Images and the like may be formed by a liquid crystal panel having liquid crystals arranged in a predetermined pattern, the liquid crystal panel forming the images by adjusting an amount of light transmitted from the backlight unit.

The LCD can be classified into a twisted nematic (TN) type and an in-plane switching (IPS) type depending on the arrangement of liquid crystals. The TN type LCD may have a narrower viewing angle relative to the IPS type LCD. However, since the TN type LCD has excellent transmittance, the TN type LCD may be particularly suitable for an LCD that is viewed head-on. On the other hand, although the IPS type LCD has a wide viewing angle compared to the TN type LCD, it may exhibit a lower transmittance, which deteriorates overall brightness.

Conventionally, a dual brightness enhancement film (DBEF) and a diffusive reflective polarization film (DRPF) have been used to compensate for brightness or to improve a viewing angle. However, these films lead to an increase in total thickness of a backlight unit along with an increase in manufacturing cost, thereby lowering cost-competitiveness of LCD products adopting these films. Accordingly, there is a need of techniques for improving brightness and a viewing angle of the LCD without using these films.

SUMMARY OF THE INVENTION

Embodiments are directed to a light guide panel, a display including the same, and associated methods, which substantially overcome one or more problems due to the limitations and disadvantages of the related art.

It is therefore a feature of an embodiment to provide a light guide panel that is configured to provide uniform brightness over a wide viewing angle.

It is therefore another feature of an embodiment to provide a light guide panel providing a high level of brightness.

At least one of the above and other features and advantages may be realized by providing a light guide panel, including a lateral side configured to transmit light to an interior of the light guide panel, a rear side configured to reflect light to the interior of the light guide panel, and a front side configured to emit light from the interior of the light guide panel. The rear side may include a repeating pattern of regions, each region having a plurality of wedge-shaped rear prisms disposed therein, and the wedge-shaped rear prisms may include at least one of a side having a predetermined radius of curvature and a side having a point of inflection.

Each wedge-shaped rear prism may have at least one side having a predetermined radius of curvature, and the side having the predetermined radius of curvature may be convex with respect to an interior of the wedge-shaped rear prism.

Each wedge-shaped rear prism may have at least one side having a predetermined radius of curvature, and the side having the predetermined radius of curvature may be concave with respect to an interior of the wedge-shaped rear prism.

Each wedge-shaped rear prism may have at least one side having a predetermined radius of curvature, and a ratio of a pitch of adjacent rear prisms to the radius of curvature may be about 1:1 to about 1:10.

Each wedge-shaped rear prism may have at least one side having a predetermined radius of curvature, and the radius of curvature may be greater than a pitch of adjacent rear prisms.

Each wedge-shaped rear prism may have at least one side having a point of inflection, and the side having the point of inflection may be convex with respect to an interior of the wedge-shaped rear prism.

Each wedge-shaped rear prism may have at least one side having a point of inflection, and the side having the point of inflection may be concave with respect to an interior of the wedge-shaped rear prism.

Each wedge-shaped rear prism may have a multi-faceted wedge that projects from the rear of the light guide panel, and the multi-faceted wedge may include a side having two straight facets that meet at the point of inflection.

The multi-faceted wedge may include at least four facets.

The multifaceted wedge may include pairs of mirror-image facets that are angled relative to one another so as to form interior angles of about 60 degrees to about 120 degrees.

The repeating pattern may include regions that are shaped as circles, ellipses, rhomboids, rectangles, or a combination thereof, and at least one of a size of the regions and a density of the regions may increase with an increase in distance from the lateral side.

The repeating pattern may have stripe-shaped regions in which a width of the stripe-shaped region increases with an increase in distance from the lateral side.

The wedge-shaped rear prisms may extend in parallel in a first direction, the first direction being substantially parallel to a longitudinal direction of the lateral side.

Each of the wedge-shaped rear prisms may have first and second sides, at least one of the first and second sides having the predetermined radius of curvature, the first and second sides may meet at a peak, and respective peaks of the wedge-shaped rear prisms may extend in parallel in a first direction, the first direction being substantially parallel to a longitudinal direction of the lateral side.

The front side may include front prisms.

The front prisms may be perpendicular to the rear prisms.

The front prisms may have separation planes defined therebetween.

An area ratio of the front prisms to the separation planes may be about 1:0.5 to about 1:10.

A ratio of height to width of the front prisms may be about 0.3 to about 0.6.

At least one of the above and other features and advantages may also be realized by providing a light guide panel, including a lateral side configured to transmit light to an interior of the light guide panel, a rear side configured to reflect light to the interior of the light guide panel, and a front side configured to emit light from the interior of the light guide panel. The rear side may include a repeating pattern of regions, each region having a plurality of wedge-shaped rear prisms disposed therein, each wedge-shaped rear prism may have at least one side that is disposed at an angle relative to a normal, and the angle may vary along a height of the prism.

At least one of the above and other features and advantages may also be realized by providing a method of fabricating a display device, the method including providing a display panel, coupling at least one driver to the display panel, and mounting a light guide panel adjacent to the display panel. The light guide panel may include a lateral side configured to transmit light to an interior of the light guide panel, a rear side configured to reflect light to the interior of the light guide panel, and a front side configured to emit light from the interior of the light guide panel, the rear side may includes a repeating pattern of regions, each region having a plurality of wedge-shaped rear prisms disposed therein, and the wedge-shaped rear prisms may include at least one of a side having a predetermined radius of curvature and a side having a point of inflection.

BRIEF DESCRIPTION OF THE DRAWINGS

The above and other features and advantages will become more apparent to those of ordinary skill in the art by describing in detail example embodiments with reference to the attached drawings, in which:

FIG. 1 illustrates a perspective view of a light guide panel according to a first embodiment;

FIGS. 2 to 5 illustrate plan views of examples of dot prisms;

FIG. 6 illustrates a perspective view of a light guide panel according to a second embodiment;

FIGS. 7 and 8 illustrate bottom views of a main body of the light guide panel of FIG. 6, showing example arrangements of stripe prisms; and FIGS. 9 to 12 illustrate enlarged vertical cross-sectional views of rear prisms.

DETAILED DESCRIPTION OF THE INVENTION

Korean Patent Application No. 10-2007-0004124, filed on Jan. 15, 2007, in the Korean Intellectual Property Office, and entitled: "Light Guide Panel Comprising Wedge-shaped Rear Prism for Back Light Unit of TFT-LCD," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

FIG. 1 illustrates a perspective view of a light guide panel 30 according to a first embodiment.

Referring to FIG. 1, the light guide panel 30 may be generally made of a transparent material, e.g., acrylic, that has high strength, is not easily broken or deformed, is lightweight, and exhibits high transmittance of visible light. The light guide panel 30 may include a main body 300, front prisms 210, and dot prisms 320. As used herein, the term "dot prisms" refers to regions having prisms therein and being shaped in the form of dots having variously-shaped circumferences, as described in further detail below. The light guide panel 30 may be used for, e.g., an LCD backlight unit. For example, in fabricating a display device, a display panel may be provided, one or more drivers may be coupled to the display panel, and the light guide panel 30 may be mounted adjacent to the display panel so as to provide light from a light source 306 through the light guide plate 30 to the display panel.

The main body 300 may include a lateral side 301 for receiving incident light, a front side 303 that is connected to the lateral side 301 and faces a display panel such as an LCD panel, and a rear side 305 that is connected to the lateral side 301 and is opposite to the front side 303.

The term "lateral side," as used herein, means a surface through which light emitted from the light source 306 enters the light guide panel 30. In FIG. 1, the lateral sides 301 are two opposite sides that are adjacent to respective light sources 306.

The front side 303 is a side through which light from the light source 306, which enters the light guide panel 30 via the lateral side 301, is emitted. Both front and rear sides 303 and 305 are connected to the lateral side 301. An interior surface of the sides is defined as a surface inside the main body 300 and an exterior surface of the sides is defined as a surface outside the main body 300.

The front side 303 may be formed with front prisms 210, each of which may have a predetermined cross-sectional shape. The front prisms 210 may serve to provide uniform diffraction, refraction, and diffusion of light emitted from the main body 300.

The front prisms 210 may be formed at regular intervals on the front side 303, and may each have a longitudinal direction that is parallel to an incident direction of light from the light source, i.e., parallel to the 'Q' direction in FIG. 1 and perpendicular to the extending direction of the lateral side 301, i.e., perpendicular to the 'P' direction in FIG. 1.

In order to further improve the uniformity and visibility of light, the front prisms 210 may be spaced apart at intervals, e.g., regular intervals, rather than being arranged closely together or abutting one another. Thus, planar portions, herein referred to as separation planes, which are parallel to the plane in which 'P' and 'Q' directions lie, may be interposed between adjacent front prisms 210. The separation planes may have substantially rectangular shapes with longitudinal directions that extend in the 'Q' direction.

The front prisms 210, which may be spaced at regular intervals from one another, may diffract, refract, and diffuse light emitted from the main body 300 in a direction slanted to a display panel facing the light guide panel 30, such that light is directed perpendicular to the display panel through the planar portions (i.e., through the spaces between the front prisms 210) defined by such regular intervals. Accordingly, the uniformity of light reaching the display panel may be enhanced.

The respective front prisms 210 may be arranged to have the longitudinal directions parallel to the 'Q' direction and perpendicular to longitudinal directions of prisms formed on the rear side 305, as described in detail below.

In an exemplary embodiment, each front prism 210 may have a vertical cross-section, i.e., a cross-section in a plane that is perpendicular to the plane in which 'P' and 'Q' directions lie, that is triangular in shape. The triangular cross sections of the front prisms 210 may be disposed to have the separation planes disposed therebetween, as shown in FIG. 1.

The separation planes may improve directionality of light emitted through the main body 300, but are not necessary. Also, although the front prisms 210 are shown as having triangular cross-sections in FIG. 1, it should be noted that the front prisms 210 may have various shapes other than the illustrated triangular cross-sections. For example, the front prisms 210 may have a trapezoidal shape, a reversed-groove shape, etc. Further, the front prisms 210 may be formed on the interior surface or the exterior surface of the front side 303.

A ratio of the area of the front prisms 210 (i.e., the area occupied by the front prisms 210 in the P-Q plane) to the area of the separation planes disposed between the front prisms 210 is preferably about 1:0.5 to about 1:10 on the front side 303 of the main body 300. However, as the area of the front prisms begins to exceed that of the separation planes, brightness may decrease. Preferably, a ratio of height (i.e., the height of the vertical cross section) to width (i.e., width in direction 'P') of the front prisms 210 is about 0.3 to about 0.6.

Referring to FIG. 1, the rear side 305 may be formed with a repeating pattern of regions, which may form a geometric pattern. The regions may be arranged in the 'P' and 'Q' directions so as to be spaced apart in the 'P' and/or 'Q' directions at regular intervals. The regions may be dot prisms 320, which may be circular or some other shape. Thus, although circular dot prisms 320 are shown in FIG. 1, other shapes may be employed.

FIGS. 2 to 5 illustrate plan views of examples of the dot prisms 320. As shown in FIGS. 2 to 5, the dot prisms 320 that form the repeating pattern may have a circular shape (FIG. 2), an elliptical shape (FIG. 3), a rhombic shape (FIG. 4), a rectangular shape (FIG. 6), etc. A combination of such shapes may also be used. The repeating pattern, which in FIG. 1 includes circular dot prisms 320, may include dot prisms 320 that are spaced apart from one another in the 'P' and 'Q' directions.

The dot prisms 320 preferably have the elliptical shape herein, as shown in FIG. 3. When the dot prisms 320 have the elliptical shape as shown in FIG. 3, a ratio of minor radius (b) to major radius (a) is preferably about 0.5 to about 0.9. A ratio of the minor radius (b) to major radius (a) that is about 0.5 to about 0.9 may provide excellent optical characteristics and provide good visibility of images on a display.

The geometrical patterns may include dot prisms 320 that increase in size and/or density with an increase in distance from the lateral side 301. Each dot prism 320 may include rear prisms 322 formed therein, as described in detail below.

FIG. 6 illustrates a perspective view of a light guide panel according to a second embodiment.

Referring to FIG. 6, the rear side 305 of the main body 300 may include a repeating pattern of stripe prisms 520 that are disposed at regular intervals, the stripe prisms 520 including the rear prisms 322.

A ratio of width to length of the stripe prisms 520 is preferably about 1:1,000 to about 1:50,000. A ratio of height (h2 in FIG. 6) to width (w2 in FIG. 6) of the stripe prisms 520 is preferably about 0.3 to about 0.9.

A plurality of stripe prisms 520 may be formed on the rear side 305. Each of the stripe prisms 520 may have a width that increases with an increase in distance from the lateral side 301. The ends of the stripe prisms 520 may be spaced apart from the lateral side 301 in order to reduce or eliminate light scattering that could form bright lines.

The rear prisms 322 in the stripe prisms 520 may be oriented so as to have a longitudinal direction that is parallel to direction 'Q' and perpendicular to an incident direction of light entering through the lateral side 301.

FIGS. 7 and 8 illustrate bottom views of a main body of the light guide panel of FIG. 6, showing example arrangements of stripe prisms 520.

FIG. 7 illustrates a bottom view of an arrangement of the stripe prisms 520 in the case where light from the light source 306 (see FIG. 1) enters the main body 300 through opposite lateral sides 301. In this case, the stripe prisms 520 may have a width that increases toward the center of the main body 300, with a maximum width at a center thereof.

Increasing the width with the increase in distance from the lateral side 301 may help offset the reduction in light arriving at the rear prisms 322 as the distance from the lateral side 301 increases. Accordingly, the stripe prisms 520, which serve to refract and reflect light, may have an increased size as the distance from the lateral side 301 increases, thereby improving refractivity and reflectivity of light, irrespective of the reduced amount of arriving light at the rear prisms 322.

FIG. 8 illustrates a bottom view of an arrangement of the stripe prisms 520 in the case where light from the light source 306 (see FIG. 1) enters the main body 300 through only one lateral side 301.

As shown in FIG. 8, in the case where light enters the main body 300 through one lateral side 301, the patterns of the stripe prisms 520 may have a width that increases in an increase in distance from the lateral side 301 to the other side.

In the configuration of FIGS. 7 and 8, it is preferable that the stripe prisms 520 are not formed close to the lateral side 301, i.e., ends of the stripe prisms 520 are spaced apart from the lateral side 301, as described above.

FIGS. 9 to 12 illustrate enlarged vertical cross-sectional views of the rear prisms 322.

Referring to FIGS. 9 to 12, the dot prisms 320 and the stripe prisms 520 may be formed with rear prisms 322 that have a predetermined vertical cross-section. The vertical cross-section may include at least two sides, which may project from the main body 300, wherein at least one side has angle (relative to a normal to the P-Q plane) that varies along the height of the rear prism 322. For example, the angle at which the side is positioned relative to the normal may vary continuously along the height of the rear prism 322, the angle may have one or more points of inflection, etc. Thus, in a particular implementation, the rear prism 322 may be in the shape of a wedge having a peak, where the sides extend from the main body 300 to the peak and have a varying angle between the main body 300 and the peak.

The rear prisms 322 forming the dot prisms 320 and stripe prisms 520 preferably have a longitudinal direction that is oriented parallel to direction 'P', i.e., perpendicular to a direction ('Q' direction) of light emitted from the light source 306. This may improve diffraction, refraction, and diffusion of light. Further, the rear prisms 322 may extend in a direction that is perpendicular to the extending direction of the front prisms 210, which may further improve the diffraction, refraction, and diffusion of light.

Referring to FIGS. 9 and 10, the rear prisms 322 may have a wedge-shaped vertical cross-section, i.e., a cross-section in a plane perpendicular to the P-Q plane. At least one side of the respective rear prisms 322 may have a predetermined radius of curvature. In an implementation, opposing sides of each rear prism 322 may form a pointed vertex. Each rear prism 322 may have concave (FIG. 9) or convex (FIG. 10) lateral sides with predetermined radii of curvature ($r_1$ and $r_2$ for the two opposing sides, respectively), where $r_1$ and $r_2$ may be the same or different. The term "radius of curvature," as used herein, means a non-zero and finite radius of curvature. A plane is a surface that has an infinite radius of curvature.

In the respective cases of concave lateral sides and convex lateral sides shown in FIGS. 9 and 10, the radii of curvature ($r_1$ and $r_2$) are preferably larger than a pitch (P) of the rear prisms 322, i.e., larger than a repeating distance of the rear prisms 322. Respective ratios of pitch (P) to radii of curvature ($r_1$ and $r_2$) (i.e., P:$r_1$ and P:$r_2$) are preferably about 1:1 to about 1:10. Thus, P:$r_1$ may be about 1:1 to about 1:10 and P:$r_2$ may be about 1:1 to about 1:10.

In another implementation, referring to FIGS. 11 and 12, the rear prisms 322 may have a side that has a point of inflection, e.g., an inward inflection or an outward inflection. The side may include straight faces that meet at the inflection. Opposing sides may be mirror images, and the wedge-shaped vertical cross-section may have a generally polygonal shape. The lateral, i.e., opposing, sides of the rear prisms 322 may be symmetric or asymmetric.

FIGS. 11 and 12 illustrate symmetric polygonal-shaped rear prisms 322 each having four facets. FIG. 11 shows a polygonal prism 322 with facets that meet at an inflection point so as to form a side that is bent inward, and FIG. 12 shows faces that meet at an inflection point so as to form a side that is bent outward.

Opposing facets of the rear prisms 322 may be angled relative to one another so as to have angles of corners (i.e., interior angles $\theta_1$, $\theta_2$, $\theta_3$, and $\theta_4$ in FIGS. 11 and 12) that are preferably about 60 degrees to about 120 degrees.

The rear prisms 322 may have a cross-section having a predetermined radius of curvature at each lateral side, or a concave or convex polygonal cross-section, as shown in FIGS. 9 to 12, may provide optimal optical characteristics. A backlight unit including a light guide panel according to embodiments may be used for a display device, e.g., a LCD monitor or TV, or another type of non-emissive display. When implemented in an LCD, the light guide plate may improve brightness of the LCD through collection of light from the backlight unit, and may broaden a viewing angle through dispersion of light from the backlight unit.

The radii of curvature, as shown in FIGS. 9 and 10, and the angles ($\theta_1$, $\theta_2$, $\theta_3$, and $\theta_4$) of the polygonal cross-sections, as shown in FIGS. 11 and 12, may be adjusted to suitably regulate a dispersion angle of light emitted from the backlight unit corresponding to the design and intended use of the display device. For example, the light guide panel may be used in an LCD backlight unit that can is optimized for visibility at a specific position and/or viewing at a specific angle.

As described above, a light guide panel according to embodiments may be used for a display device, e.g., as part of an LCD backlight unit, to optimize distribution of viewing angles corresponding to requirement of a display, thereby enabling efficient use of a light source of the backlight unit. In addition, the light guide panel may be formed to be thin and with low manufacturing costs. Further, the light guide panel may satisfy particular optical characteristics set forth in the TCO '03 standard while ensuring high brightness and good viewing angle characteristics. Further, films such as the DBEF and DRPF that are used for the conventional light guide panel may be eliminated.

Example embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A light guide panel, comprising:
   a lateral side configured to transmit light to an interior of the light guide panel;
   a rear side configured to reflect light to the interior of the light guide panel; and
   a front side configured to emit light from the interior of the light guide panel, wherein:
   the rear side includes dot patterns or stripe patterns, each pattern having a plurality of wedge-shaped rear prisms disposed therein, each wedge-shaped rear prism having a multi-faceted wedge that projects from the rear side of the light guide panel, and
   the multi-faceted wedge includes pairs of mirror-image facets that are angled relative to one another so as to form two interior angles of about 60 degrees to about 120 degrees, each side of the pairs of mirror-image facets including two straight facets that meet at a point of inflection such that the multi-faceted wedge includes at least four facets.

2. The light guide panel as claimed in claim 1, wherein the sides of the pairs of mirror-image facets are convex with respect to an interior of the wedge-shaped rear prism.

3. The light guide panel as claimed in claim 1, wherein the sides of the pairs of mirror-image facets are concave with respect to an interior of the wedge-shaped rear prism.

4. The light guide panel as claimed in claim 1, wherein at least one of a size of the of the dot patterns or stripe patterns and a density of the dot patterns or strip patterns increases with an increase in distance from the lateral side.

5. The light guide panel as claimed in claim 1, wherein the rear side includes stripe patterns in which a width of each stripe pattern increases with an increase in distance from the lateral side.

6. The light guide panel as claimed in claim 1, wherein the wedge-shaped rear prisms extend in parallel in a first direction, the first direction being substantially parallel to a longitudinal direction of the lateral side.

7. The light guide panel as claimed in claim 6, wherein:
   each of the wedge-shaped rear prisms has first and second sides,
   the first and second sides meet at a peak, and
   respective peaks of the wedge-shaped rear prisms extend in parallel in a first direction, the first direction being substantially parallel to a longitudinal direction of the lateral side.

8. The light guide panel as claimed in claim 1, wherein the front side includes front prisms.

9. The light guide panel as claimed in claim 8, wherein each front prism extends in a second direction perpendicular to a longitudinal direction of the lateral side, and the plurality of wedge-shaped rear prisms extend in a first direction parallel to the longitudinal direction of the lateral side.

10. The light guide panel as claimed in claim 8, wherein a ratio of height to width of the front prisms is about 0.3 to about 0.6.

11. The light guide panel as claimed in claim 8, wherein the front prisms have separation planes defined therebetween.

12. The light guide panel as claimed in claim 11, wherein an area ratio of the front prisms to the separation planes is about 1:0.5 to about 1:10.

13. A light guide panel, comprising:

a lateral side configured to transmit light to an interior of the light guide panel;

a rear side configured to reflect light to the interior of the light guide panel; and a front side configured to emit light from the interior of the light guide panel, wherein:

the rear side includes dot patterns or stripe patterns, each pattern having a plurality of wedge-shaped rear prisms disposed therein, the plurality of wedge-shaped rear prisms projecting from the rear surface of the light guide panel, each wedge-shaped rear prism includes pairs of mirror-image facets that are disposed at an angle relative to a normal, the angle relative to the normal varying along a height of the prism, and the pairs of mirror-image facets are angled relative to one another so as to form interior angles of about 60 degrees to about 120 degrees, each side of the pairs of mirror-image facets including two straight facets that meet at a point of inflection such that each wedge-shaped rear prism includes at least four facets.

14. A method of fabricating a display device, the method comprising:

providing a display panel;

coupling at least one driver to the display panel; and mounting a light guide panel adjacent to the display panel; wherein:

the light guide panel includes:
- a lateral side configured to transmit light to an interior of the light guide panel;
- a rear side configured to reflect light to the interior of the light guide panel; and
- a front side configured to emit light from the interior of the light guide panel, the rear side includes dot patterns or stripe patterns, each pattern having a plurality of wedge-shaped rear prisms disposed therein, and each wedge-shaped rear prism having a multi-faceted wedge that projects from the rear side of the light guide panel, and the multi-faceted wedge includes pairs of mirror-image facets that are angled relative to one another so as to form two interior angles of about 60 degrees to about 120 degrees, each side of the pairs of mirror-image facets including two straight facets that meet at a point of inflection such that the multi-faceted wedge includes at least four facets.

* * * * *